3,161,818
TRANSISTOR SWITCHING CIRCUIT UTILIZING VARIABLE IMPEDANCE BIASING MEANS
Harold H. Britten and Henry W. Gayek, Waynesboro, Va., assignors to General Electric Company, a corporation of New York
Filed Oct. 4, 1961, Ser. No. 142,797
1 Claim. (Cl. 322—28)

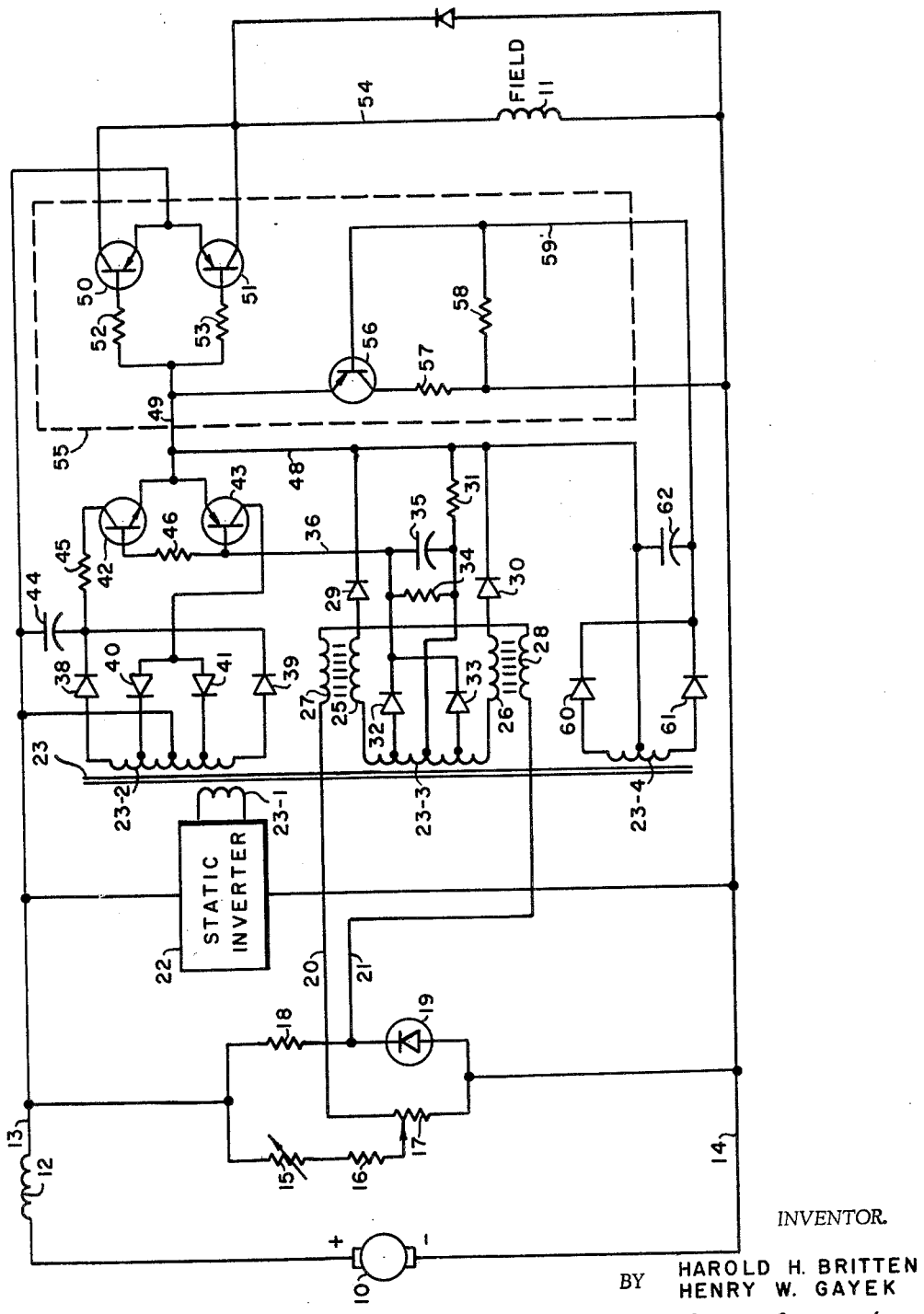
INVENTOR.
HAROLD H. BRITTEN
HENRY W. GAYEK
BY Robert R. Strack
ATTORNEY United States Patent Office 3,161,818
Patented Dec. 15, 1964

This invention relates to voltage regulators and more particularly, to transistor switching circuits adapted to yield improved voltage regulator characteristics.

Solid state components are finding increasing use in conjunction with power generating equipment. In generator regulators, for instance, transistor circuits are being used to control field current in place of circuitry including carbon-pile regulators. A problem is presented when self-excited generators utilize transistorized regulators. It has been found that throughout the entire range of operating temperatures encountered, the generator may fail to build up. This difficulty may be traced to the variation in transistor operating characteristics within the required temperature range.

An object of the invention is to provide an improved transistorized voltage regulation circuit, operative throughout extreme ranges of temperature to afford self-buildup of an associated generator to a desired voltage output.

The voltage regulation circuit described hereinafter utilizes the pulse width modulation technique for regulating the amount of power applied to a D.C. generator field in accordance with the voltage appearing at the ouput of the generator. Such a system includes connecting the field winding of the generator in series with a switching means across the generator output. A pulse width modulator controls the conduction period of the switching means, increasing it when the voltage output is too low and decreasing it when the voltage output is too high. Since the field receives power during the conduction period only, the ratio of "closed" to "open" time of the switching means determines the total amount of power delivered to the field.

Self-excited generators rely upon the residual magnetism of the field to provide sufficient output voltage during start-up to increase the field current and effect buildup to rated voltage. When using transistor switching means for field current control, it has heretofore been necessary to use elements to insure buildup that cause excessive power dissipation during normal running operation. This arises because the biasing circuitry required to establish full conduction of the switching transistors during initial buildup requires a small biasing resistance in the base circuit. Subsequently, during normal running operation, when the switching transistors are controlled by the pulse width modulating means, this small resistance causes large current drains and makes control over the switching transistors inefficient.

Another object of the invention is to provide an improved transistorized switching circuit in series with a generator field including initially low impedance biasing means adapted to exhibit high impedance during normal running operation.

From another aspect, it is an object of the present invention to provide means for initially biasing a transistor switching circuit in a low impedance circuit, and subsequently, in accordance with preselected conditions, substituting a high impedance biasing circuit.

In accordance with an illustrative embodiment of the invention, the energization of a direct current generator is controlled by switching transistors that are serially connected with the field thereof across the terminals of the generator. Voltage regulating means responsive to the difference between the terminal voltage and a fixed reference potential controls pulse width modulating means which in turn control the conduction period of the switching transistors. A unique bias control transistor circuit is interconnected with the power switching transistors in order to furnish a low impedance base biasing path during the initial buildup stage of the generator. When sufficient generator terminal voltage has been attained to permit functioning of the voltage regulating and pulse width modulating means, the bias control transistor circuit is operative to replace the low impedance path with a high impedance path.

The novel features of the invention are set forth with particularity in the appended claims. The invention itself, however, both as to its organization and method of operation, together with further objects and features thereof, may best be understood by reference to the following description taken in conjunction with the single accompanying drawing which illustrates a typical voltage regulation circuit embodying the features of the invention.

The circuit illustrates a generator 10 providing self-excitation for the field winding 11 located on the right of the drawing. When rotated by a prime mover, not shown, generator 10 produces voltage of the polarity illustrated. Thus, positive potential is applied via filter reactor 12 to positive supply conductor 13 and negative potential is applied directly to negative supply conductor 14. Field winding 11 is serially connected with switching transistor 50 and 51 directly across supply conductors 13 and 14 and consequently, during conduction of these transistors, has current flow therethrough in accordance with the terminal voltage of generator 10. The total amount of energy applied to field winding 11 is controlled by varying the "on" to "off" time of the conduction interval of switching transistors 50 and 51.

Typically, a static inverter 22 is used to produce alternating current from the generated direct current. Static inverter 22 is connected between supply conductors 13 and 14 and may take any of the many forms well known in the art. For example, a free-running multivibrator may be used. The output of static inverter 22 is generally in the form of a square wave and is applied via transformer 23 to the pulse width modulating and biasing circuits of the field control system.

Switching transistors 50 and 51 are repetitively switched "on" and "off" from full conduction to nonconduction at twice the frequency of the output from static inverter 22. During each half cycle, at a time determined by the difference between the actual output voltage and the desired output voltage, transistors 50 and 51 are rendered conductive as a result of the "firing" of a magnetic amplifier associated with the secondary winding 23–3 of transformer 23. This magnetic amplifier may advantageously be of the self-saturating "amplistat" type and comprises gate windings 25 and 26 serially connected with rectifiers 29 and 30 respectively to opposite ends of center-tapped transformer secondary 23–3. Rectifiers 29 and 30 are oriented to provide a positive pulse to conductor 48, to which their cathodes are connected, each time the core of the magnetic amplifier saturates. It is these positive pulses that are effective via further circuitry described hereinafter to render switching transistors 50 and 51 conductive.

The initial saturation of the core of the magnetic amplifier is controlled in accordance with the output of the bridge circuit illustrated adjacent to generator 10 to establish "firing" at the time calculated to permit transistors 50 and 51 to supply the correct amount of energy to field winding 11 for the desired output voltage. This bridge circuit includes variable resistor 15, resistor 16, and the lower half of a potentiometer 17 in one branch between conductors 13 and 14, and resistor 18 and voltage regulating diode 19 in another branch between conductors 13 and 14. The output of the bridge is taken between one end of potentiometer 17 and the cathode of reference diode 19 and is applied in series over conductors 20 and 21 through the control windings 27 and 28 of the magnetic amplifier. By varying the value of resistance 15 and the setting of potentiometer 17, correct current is established in control windings 27 and 28 to maintain a desired voltage output on generator 10 in accordance with the constant reference potential across diode 19. Any deviation of the output from this desired voltage gives rise to a change in the current in a direction to compensate for the deviation and return the generator output to normal.

The unique switching circuitry of the invention is enclosed by dashed lines 55 and includes PNP transistors 50, 51, and 56. Transistors 50 and 51 are connected in parallel having the respective emitters and collectors thereof connected together and to positive supply conductor 13 and field winding 11 respectively. The bases of transistors 50 and 51 are joined by low impedance coupling resistors 52 and 53 and the junction between these resistors is connected to the emitter of transistor 56. A low impedance 57 connects the collector of transistor 56 to negative supply conductor 14 and conductor 59 connects the base thereof to the positive terminal of a bias source created by full-wave rectifying the voltage induced in transformer secondary 23-4. A resistor 58 connects the base of transistor 56 to negative supply conductor 14.

Resistor 57 is of a magnitude calculated to insure generator buildup under all temperature conditions to be experienced. This requires that it be small enough to furnish a base biasing circuit for switching transistors 50 and 51 which will render them conductive when only the initial voltage due to residual magnetism is present on the output of generator 10. In operation, transistor 56 is initially conducting and provides a low impedance base current path for transistors 50 and 51 through resistor 57 to negative supply conductor 14. Upon development of sufficient terminal voltage, static inverter 22 provides an alternating voltage output which energizes the pulse modulating portion of the regulating circuitry. At this time, the voltage regulating circuitry takes control of transistors 50 and 51 and transistor 56 is rendered nonconductive thereby presenting a high impedance base circuit path to afford efficient control over the switching transistors by the voltage regulating circuitry.

The initial field energization path includes the positive terminal of generator 10, filter reactor 12, positive supply conductor 13, the emitter to collector paths of switching transistors 50 and 51, conductor 54, field winding 11, negative supply conductor 14, and the negative terminal of generator 10. At this time switching transistors 50 and 51 are maintained conductive because the voltage drop in the base biasing circuit is not too great with respect to the emitter-base voltage drop and sufficient forward bias is therefore present. During this phase of operation, emitter to base current flows in the circuit including positive conductor 13, the emitter-base paths of transistors 50 and 51, the coupling resistors 52 and 53, the emitter-collector path of transistor 56, low impedance 57, and negative conductor 14. Because the conduction of switching transistors 50 and 51 is determined solely by the described path, the conduction period is continuous; only when the generator output voltage attains sufficient magnitude to enable the voltage regulating circuit, does this initial circuit relinquish control.

When the voltage across generator 10 attains a sufficient magnitude to produce operation of static inverter 22, the inverter supplies an alternating current in primary winding 23-1 of transformer 23 which induces voltages in each of transformer secondaries 23-2, 23-3, and 23-4. Transformer secondary 23-2 is effective to provide biasing voltage for transistors 42 and 43 that function as control amplifiers responsive to the output of the magnetic amplifier to control the state of switching transistors 50 and 51. Transformer secondary 23-3 provides an alternating polarity pulse input for the magnetic amplifier circuit that functions as a pulse width modulator. Transformer secondary 23-4 provides biasing potential for rendering transistor 56 nonconductive.

Control over switching transistors 50 and 51 will be understood following a consideration of the sequence of circuit operations in response to each half cycle of voltage induced in the secondary windings of transformer 23.

First, base control transistor 56 is rendered nonconductive, thereby replacing the initially low impedance base circuit path by a high impedance path. The reverse bias for cutting off transistor 56 is developed by a full wave rectifier circuit comprising rectifiers 60 and 61 connected to opposite ends of center-tapped secondary 23-4. The rectifiers are oriented to apply a reverse-biasing voltage between the emitter and base of transistor 56 in the circuit comprising the cathodes of rectifiers 60 and 61, conductor 59, the base to emitter path of transistor 56, conductors 49 and 48, and the center-tap of secondary winding 23-4.

Upon termination of conduction in transistor 56, bias control over switching transistors 50 and 51 is transferred to the voltage regulating circuitry and a reverse bias is immediately applied via the circuit comprising secondary winding 23-2, rectifier 38 or 39, resistor 45, the collector-emitter path of conducting transistor 42, conductor 49, coupling resistors 52 and 53, the base-emitter paths of transistors 50 and 51, positive supply conductor 13 and the center-tap of secondary winding 23-2. In response to this reverse bias, transistors 50 and 51 are rendered nonconductive and this state continues until the magnetic amplifier fires and control transistor 42 is rendered nonconductive.

The circuit which exercises direct control over the biasing of the switching transistors during normal running operation comprises both NPN transistor 42 and PNP transistor 43. A full-wave rectifying circuit consisting of rectifiers 38 and 39 connected to opposite ends of secondary 23-2 applies positive potential via resistor 45 to the collector of transistor 42; a filter capacitor 44, being connected between the junction of the rectifiers and resistor 45 and positive supply conductor 13 to reduce ripple. A second full-wave rectifying circuit 40, 41 applies negative potential to the collector of transistor 43. This second circuit yields a lower magnitude of voltage and comprises rectifiers 40 and 41 connected to taps that are equidistant from the center of secondary 23-2. The particular location of the taps mentioned is a matter of circuit design. The emitters of transistors 42 and 43 are connected directly together, and the bases thereof are joined by a resistor 46. The states of transistors 42 and 43 are controlled via conductors 36 and 48 connected respectively to the base of transistor 43 and the joint emitter connection of both transistors.

At the beginning of each half cycle of voltage induced in the secondary windings of transformer 23, the charge appearing across capacitor 35 in the magnetic amplifier circuitry maintains transistor 42 conductive and transistor 43 nonconductive. Capacitor 35 is charged with its upper electrode positive, as illustrated, due to the full-wave rectifying action of rectifiers 32 and 33 which are properly oriented and connected between respective taps on secondary windings 23-3 and said upper electrode. The lower electrode of capacitor 35 is connected directly to the center-tap of secondary 23-3 and a resistor 34 shunts capacitor 35 to provide a direct current path between rectifiers 32 and 33 and the center-tap of secondary 23-3. The positive potential on the upper electrode of capacitor 35 is applied via conductor 36 to the bases of transistors 42 and 43 and the relatively negative potential on its lower electrode is applied via resistor 31 and conductor 48 to the emitters of transistors 42 and 43. Because of the different types of transistors used, transistor 42 conducts and transistor 43 is cut off. As mentioned previously, conduction of transistor 42 renders switching transistors 50 and 51 nonconductive.

Upon elapse of a period of time determined by the difference between the actual terminal voltage and the desired terminal voltage, the magnetic amplifier delivers a positive impulse on conductor 48 which is effective to reverse-bias transistor 42 and forward-bias transistor 43. Transistor 42 is thus rendered nonconductive and transistor 43 is rendered conductive. As a consequence, conductor 49 assumes a low potential and switching transistors 50 and 51 are triggered into conduction and remain conducting until commencement of the next half cycle, at which time the above described sequence of operation is repeated.

In recapitulation, the described embodiment incorporates means for insuring buildup of a self-excited generator. Switching transistors serially connected with the field of the generator afford the control over field energization required to yield good voltage regulation. A transistor connected in the base circuit of the switching transistors provides the necessary low impedance required for biasing directly from the initially low voltage obtained from residual magnetism in the field and at the same time provides means for furnishing a high impedance in the base circuit during normal running operation. No stabilizing arrangements or other improvements have been illustrated in the described embodiment; however, such improvements may be added by those having ordinary skill in the art.

The described circuitry constitutes a particular embodiment of this invention. It will, of course, be understood that it is not wished to be limited thereto since modifications can be made both in the circuit arrangements and in the instrumentalities employed and it is contemplated in the appended claim to cover any such modifications as fall within the true spirit and scope of the invention.

What is claimed as new and desired to be secured by Letters Patent of the United States is:

In a voltage regulating circuit for controlling the energization of a generator field in accordance with the output voltage at the terminals of the generator, transistor means having emitter, collector, and base electrodes, said emitter and collector electrodes being serially connected with said generator field across the terminals of said generator, a low impedance, a transistor having its emitter and collector electrodes serially connected with said low impedance between the base electrode of said transistor means and the junction between said generator field and said generator terminal, means for rendering said transistor conductive even in response to the output voltage developed entirely due to residual magnetism in said generator field, inversion means connected across the terminals of said generator operative in response to output voltages above a predetermined level to produce an alternating voltage, means operative in response to said alternating voltage to produce signals every half cycle thereof at a time determined by the magnitude of said output voltage, first control means operative in response to said alternating voltage to render said transistor nonconductive, second control means initially operative in response to said alternating voltage to render said transistor means nonconductive and further operative upon occurrence of said signals to render said transistor means conductive.

References Cited by the Examiner
UNITED STATES PATENTS 2,892,143   6/59   Sommer.
2,896,149   7/59   Lowry et al.
2,976,473   3/61   Shaw et al.

RALPH D. BLAKESLEE, *Acting Primary Examiner.*

LLOYD McCOLLUM, *Examiner.*